(12) United States Patent
Baltes et al.

(10) Patent No.: US 11,885,453 B2
(45) Date of Patent: Jan. 30, 2024

(54) DAMPING DEVICE

(71) Applicant: HYDAC TECHNOLOGY GMBH, Sulzbach/Saar (DE)

(72) Inventors: Herbert Baltes, Losheim (DE); Peter Kloft, Ransbach-Baumbach (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 594 days.

(21) Appl. No.: 17/053,136

(22) PCT Filed: Apr. 12, 2019

(86) PCT No.: PCT/EP2019/059518
§ 371 (c)(1),
(2) Date: Nov. 5, 2020

(87) PCT Pub. No.: WO2019/214903
PCT Pub. Date: Nov. 14, 2019

(65) Prior Publication Data
US 2021/0207753 A1    Jul. 8, 2021

(30) Foreign Application Priority Data
May 9, 2018 (DE) .................. 10 2018 003 848.4

(51) Int. Cl.
*F04B 11/00* (2006.01)
*F16L 55/04* (2006.01)
(Continued)

(52) U.S. Cl.
CPC ........ *F16L 55/02736* (2013.01); *F04B 11/00* (2013.01); *F04B 11/0091* (2013.01);
(Continued)

(58) Field of Classification Search
CPC .. B01D 2321/2016; B01F 25/12; B01F 25/40; B01F 25/41; B01F 25/42;
(Continued)

(56) References Cited

U.S. PATENT DOCUMENTS 832,400 A * 10/1906 Lyons ................. B01F 25/83
222/459
997,610 A * 7/1911 Feldkamp ............. C25D 1/08
205/75

(Continued)

FOREIGN PATENT DOCUMENTS

CA          2 488 533      5/2006
DE    10 2008 015 763      1/2009
(Continued)

OTHER PUBLICATIONS

International Search Report (ISR) dated Jul. 12, 2019 in International (PCT) Application No. PCT/EP2019/059518.

*Primary Examiner* — Robert K Arundale
*Assistant Examiner* — Richard K. Durden
(74) *Attorney, Agent, or Firm* — WENDEROTH, LIND & PONACK, L.L.P.

(57) ABSTRACT

A damping device, in particular for damping or preventing pressure surges, such as pulsations, in hydraulic supply circuits, preferably in the form of a silencer, has a damping housing (2) encompassing a damping chamber (10). The damping housing (2) has at least one fluid inlet (6) and at least one fluid outlet (8), as well as a fluid receiving chamber extending between the fluid inlet (6) and the fluid outlet (8). During operation of the device, a fluid flow coming from the fluid inlet (6) passes through the damping chamber (10) towards the fluid outlet (8). A wall part of the fluid receiving chamber extends as a guide element (16) in at least one direction of extension transverse to the direction of the fluid flow. In the damping chamber (10), several guide elements (Continued)

(16) are provided, against which guide elements the fluid can flow to alter the flow velocity in certain areas.

17 Claims, 3 Drawing Sheets

(51) Int. Cl.
*F16L 55/027* (2006.01)
*F15B 21/00* (2006.01)

(52) U.S. Cl.
CPC ............. *F16L 55/04* (2013.01); *F16L 55/041* (2013.01); *F15B 21/008* (2013.01); *F15B 2211/8616* (2013.01)

(58) Field of Classification Search
CPC .... B01F 25/421; B01F 25/422; B01F 25/423; B01F 25/4231; B01F 25/4232; B01F 25/431; B01F 25/4317; B01F 25/43172; B01F 25/4318; B01F 25/4319; B01F 25/431971; B01F 25/432; B01F 25/4321; B01F 25/43231; B01F 25/4332; B01F 25/4333; B01F 25/4337; B01F 25/4338; B01F 25/4413; B01F 25/45; B01F 25/83; B01F 2025/93; B01F 33/3012; B01F 33/3017; F01N 1/00; F01N 1/06; F01N 1/08; F01N 1/083; F01N 1/086; F01N 1/087; F01N 1/088; F02M 37/0041; F15B 21/008; F15B 2211/8613; F15B 2211/8616; F15C 1/18; F15D 1/0005; F15D 1/001; F15D 1/0015; F15D 1/0025; F15D 1/003; F15D 1/02; F15D 1/025; F15D 1/065; F15D 1/14; F16L 55/027; F16L 55/02736; F16L 55/02745; F16L 55/02754; F16L 55/02763; F16L 55/041; F23M 9/10; F28D 1/0233; F28D 1/0246; F28D 1/05375; F28F 1/025; F28F 2001/027; F28F 1/426; F28F 13/08; F28F 2250/106; Y10T 137/87265; Y10T 137/87273; Y10T 137/87539
USPC .......... 138/37, 38, 39, 40, 42; 181/233, 264, 181/268, 269, 270, 274, 281, 282, 283; 210/349; 222/459; 239/461; 366/176.1, 366/181.5, 336, 338, 341
See application file for complete search history.

(56) References Cited

U.S. PATENT DOCUMENTS

| | | | | |
|---|---|---|---|---|
| 1,024,703 A * | 4/1912 | Snyder | ................ | F01N 1/08 181/264 |
| 1,673,409 A * | 6/1928 | Kelley | ................ | F28F 9/0265 165/174 |
| 1,865,677 A * | 7/1932 | Cheyney | ................ | F24F 13/24 181/256 |
| 2,079,067 A * | 5/1937 | Herbster | ................ | F24H 3/065 126/110 B |
| 2,101,782 A * | 12/1937 | Kuhner | ................ | F28F 9/0221 165/157 |
| 2,335,687 A * | 11/1943 | Modine | ................ | F28F 13/06 165/174 |
| 2,559,069 A * | 7/1951 | England | ................ | F28F 19/00 138/42 |
| 4,719,941 A * | 1/1988 | Moser | ................ | F16L 55/027 138/43 |
| 4,865,460 A * | 9/1989 | Friedrich | ................ | B01F 25/431 366/147 |
| 5,529,118 A * | 6/1996 | Nitta | ................ | F28D 1/0246 165/179 |
| 6,039,114 A * | 3/2000 | Becker | ................ | H01L 23/473 257/E23.098 |
| 7,089,961 B2 * | 8/2006 | Morton | ................ | F16K 47/08 137/625.33 |
| 7,389,852 B2 * | 6/2008 | Voss | ................ | F28D 9/0062 181/255 |
| 9,863,568 B2 | 1/2018 | Novellani et al. | | |
| 2011/0000741 A1 * | 1/2011 | Berker | ................ | F24F 13/24 181/296 |
| 2015/0308602 A1 * | 10/2015 | Kloft | ................ | F16L 55/04 138/26 |
| 2016/0265706 A1 * | 9/2016 | Novellani | ........... | F16L 55/0336 |
| 2017/0138507 A1 * | 5/2017 | Kluz | ................ | F16K 47/08 |
| 2017/0246593 A1 * | 8/2017 | Anquetil | ................ | B01D 63/066 |
| 2018/0094657 A1 * | 4/2018 | Baltes | ................ | F16L 55/033 |

FOREIGN PATENT DOCUMENTS

| | | | | |
|---|---|---|---|---|
| DE | 10 2009 046 578 | | 5/2011 | |
| DE | 10 2015 003 016 | | 9/2016 | |
| EP | 0368513 A2 * | | 5/1990 | ............ F15D 1/065 |
| GB | 721860 | | 1/1955 | |
| WO | WO-2016142033 A1 * | | 9/2016 | ............ F15B 21/00 |

* cited by examiner

DAMPING DEVICE

FIELD OF THE INVENTION

The invention relates to a damping device, in particular for damping or preventing pressure surges, such as pulsations, in hydraulic supply circuits, preferably in the form of a silencer. The damping device has a damping housing encompassing a damping chamber. The damping housing has at least one fluid inlet and at least one fluid outlet, as well as a fluid receiving chamber extending between the fluid inlet and the fluid outlet. During operation of the damping device, a fluid flow coming from the fluid inlet passes through the damping chamber towards the fluid outlet. A wall part of the fluid receiving chamber extends as a guide element in at least one direction of extension transverse to the direction of the fluid flow.

BACKGROUND OF THE INVENTION

Damping devices of this type are state of the art. Such hydro-dampers, also known as sound damper or silencers, are used to reduce vibrations caused by pressure pulsations periodically superimposed on a concerning hydro-system, in particular by the operation of hydraulic pumps. As shown in document DE 10 2015 003 016 A1, which discloses a damping device of the aforementioned genus in the form of a disk silencer, a guide element, against which fluid can flow, is provided in the circular cylindrical, disk-shaped fluid receiving chamber, which forms the damping chamber. This guide element is formed by a projection that is formed integral with an end wall serving as a cover part and that cantilevers into the damping chamber and extends to its bottom. The arrangement of the guide element permits achieving a partial increase of the flow velocity and an improvement of the damping efficiency.

SUMMARY OF THE INVENTION

Based on this state of the art, the invention addresses the object of providing a damping device of the genus mentioned at the beginning, which is characterized by a particularly advantageous operational behavior.

According to the invention, this object is basically solved by a damping device having, as an essential feature of the invention, in the damping chamber several guide elements against which the fluid can flow to alter the flow velocity in certain areas. According to the number of guide elements, there are several distributed areas having altered flow velocities. In addition, the distributed arrangement of the guide elements results in a splitting of the flow path, so that overall an increased damping efficiency can be achieved.

Advantageously, the guide elements can be arranged in rows to each other in such a way that at least some of the guide elements are offset to the guide elements of an adjacent row, forming an at least partially meandering fluid flow. Accordingly, not only the flow velocity is changed, but also the basic direction of the fluid flow from the fluid inlet to the fluid outlet.

The arrangement can be advantageously such that the number of guide elements in a respective row transverse to the direction of flow coming from the fluid inlet increases by one guide element each in the direction of the greatest transverse extension of the damping chamber and decreases by one guide element each in the direction of the fluid outlet coming from the greatest number until the number of guide elements in a row at the fluid inlet and fluid outlet is identical.

In advantageous embodiments, the damping housing and/or the damping chamber is/are of circular cylindrical or polygonal form. The guide elements are at least partially, preferably all, of identical form and extend between the opposing end walls of the damping housing.

In particularly advantageous embodiments, the two ends of at least some of the guide elements, preferably of all guide elements, merge into the respectively assigned end walls of the damping housing. At the high pressure level to which the damping housing as a pressure vessel is frequently exposed during operation as a silencer, the connection, formed by the guide elements, between the two end walls of the housing results in a considerable increase in stiffness together with a particular improvement in compressive strength and structural strength at a low construction weight.

Advantageously, at least some of the guide elements, preferably all guide elements, can be formed as continuous hollow bodies, having a cylindrical central part, to the ends of which cones are connected. Each cone widens in the direction of the assignable end side of the damping housing. The formation of the inserts connecting the end walls particularly increases the structural strength in relation to the construction weight. Due to the cones, there is a particularly advantageous damping situation in the damping housing.

The arrangement can be such that in a central longitudinal section through the damping housing octagonal cavities are formed, into which a guide element is inserted adjacently, and/or such that in a central cross-section through the damping housing transverse to the direction of flow, the guide elements delimit hexagonal cavities between them, through each of which the fluid flows in the direction of flow.

Advantageously, the guide elements are distributed such that the ends, merging into the end faces along the cones, of adjacent guide elements are at a short distance from each other or in contact with each other.

When producing the damping device, advantageously at least the damping housing, formed integrally with the guide elements, can be obtained by a 3D printing process, preferably from a metal material. Furthermore, preferably fluid inlet and fluid outlet are also obtained using in the printing process mentioned and are an integral part of the damping device as a whole.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
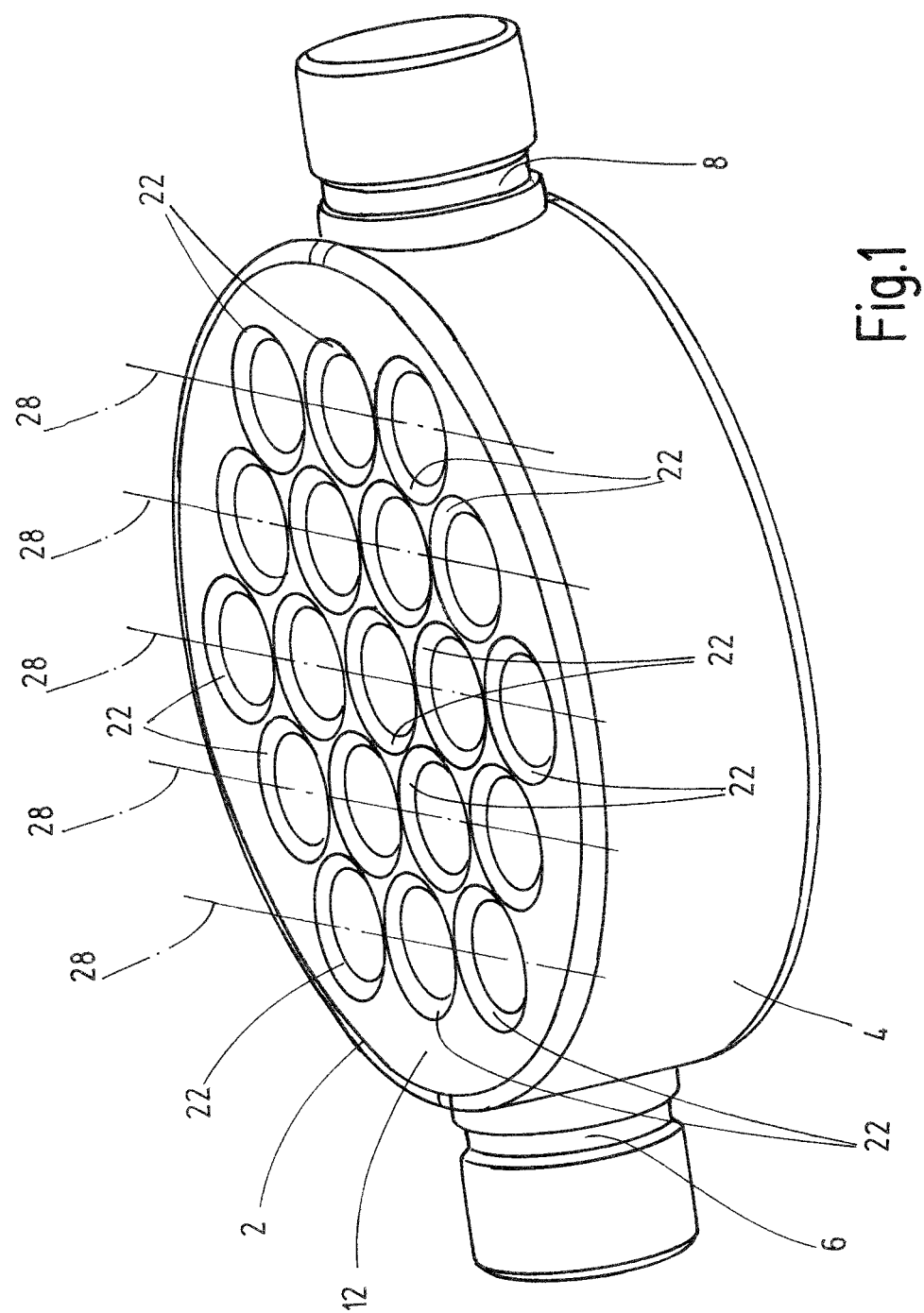
FIG. 1 is a perspective view of a damping device according to an exemplary embodiment of the invention.

With reference to the enclosed drawings, the damping device according to the invention is explained using a disk silencer by way of example. As FIG. 1 shows, the disk silencer has a circular cylindrical damping housing 2. A fluid inlet 6 and a fluid outlet 8 are arranged at two locations diametrically opposite from each other on the side wall 4 of the damping housing 2. The inlet 6 and outlet 8 form the connections to a fluid receiving chamber 10 forming a damping chamber. The fluid receiving chamber 10 has the form of a circular cylindrical disk between two top walls or end walls 12 and 14, each of which has the form of a flat circular disk.

The fluid chamber 10 contains a plurality of guide elements 16 in the flow path leading from the fluid inlet 6 to the outlet 8. The guide elements 16 are arranged in a pattern. As can be seen from FIGS. 2 and 3, the guide elements 16, only some of which are numbered in the drawing, are each formed by a hollow body constructed in one piece and extends from the end wall 12 to the end wall 14. The guide elements 16 are constructed integrally with the respective end walls 12, 14. The hollow bodies of the guide elements 16 of the same construction each have a circular-cylindrical central part 18, to which a cone 20 adjoins at each end. The cones 20 widen in the direction of the assigned front wall 12 or 14, into which their ends 22 (only partially numbered) merge.

In FIG. 1, only the ends 22 of the guide elements 16 (only partially numbered) are visible. The pattern of the guide elements 16 is a row arrangement having rows 28 (FIG. 2), which extend in a straight line and in parallel to each other perpendicular to the connecting line between the fluid inlet 6 and the fluid outlet 8. Starting from the fluid inlet 6 and the fluid outlet 8 and in the direction towards the center of the damping chamber, the number of guide elements 16 per row 28 each increases by one guide element 16. In the arrangement shown having five rows 28 and three guide elements 16 in the row 28 closest to the fluid inlet 6 and the fluid outlet 8, the pattern in the embodiment shown has a total number of 19 guide elements 16.

Figure 2:
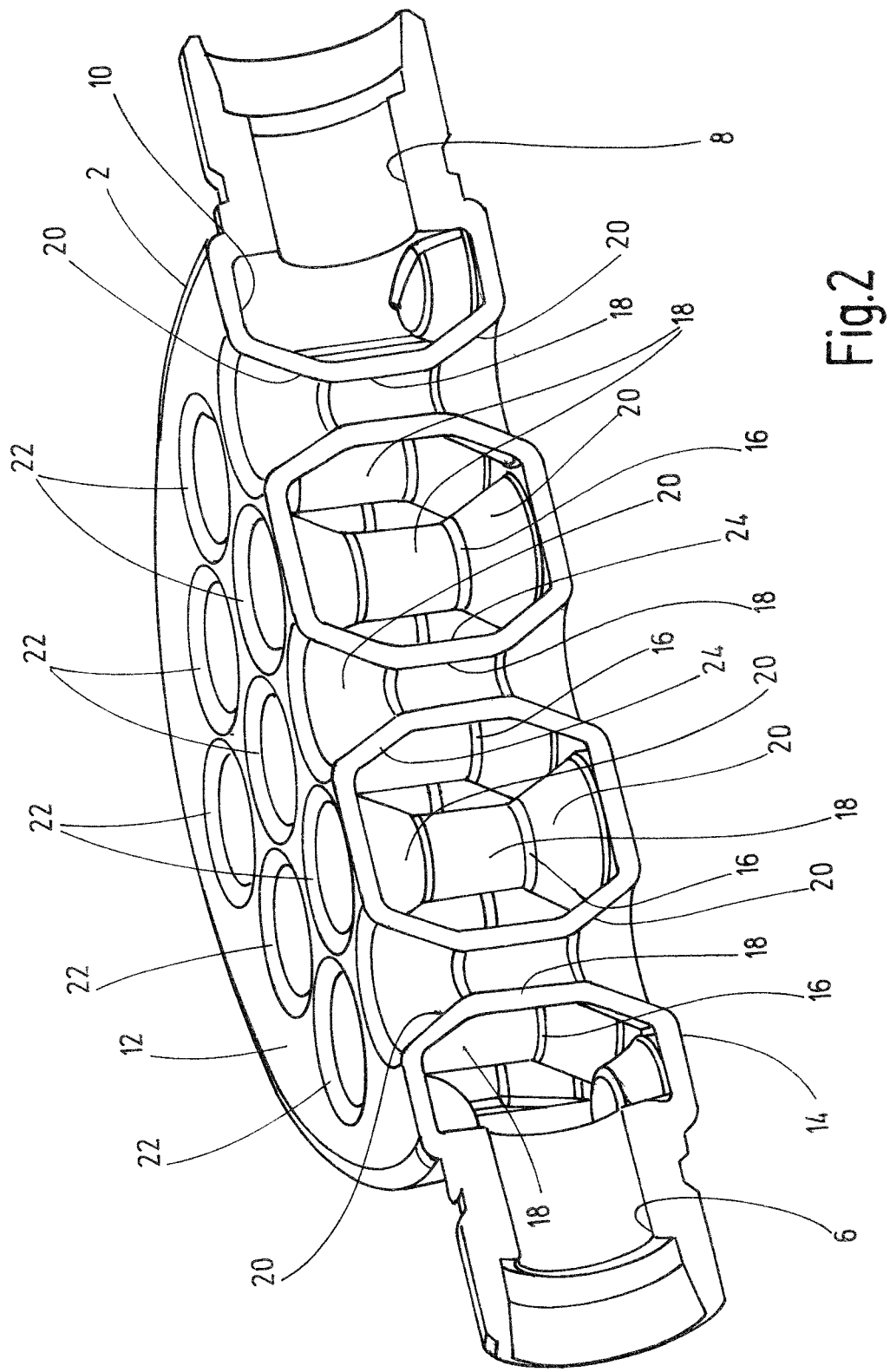
FIG. 2 is a perspective view of a central longitudinal section of the damping housing of FIG. 1 that is enlarged compared to FIG. 1.
Figure 3:
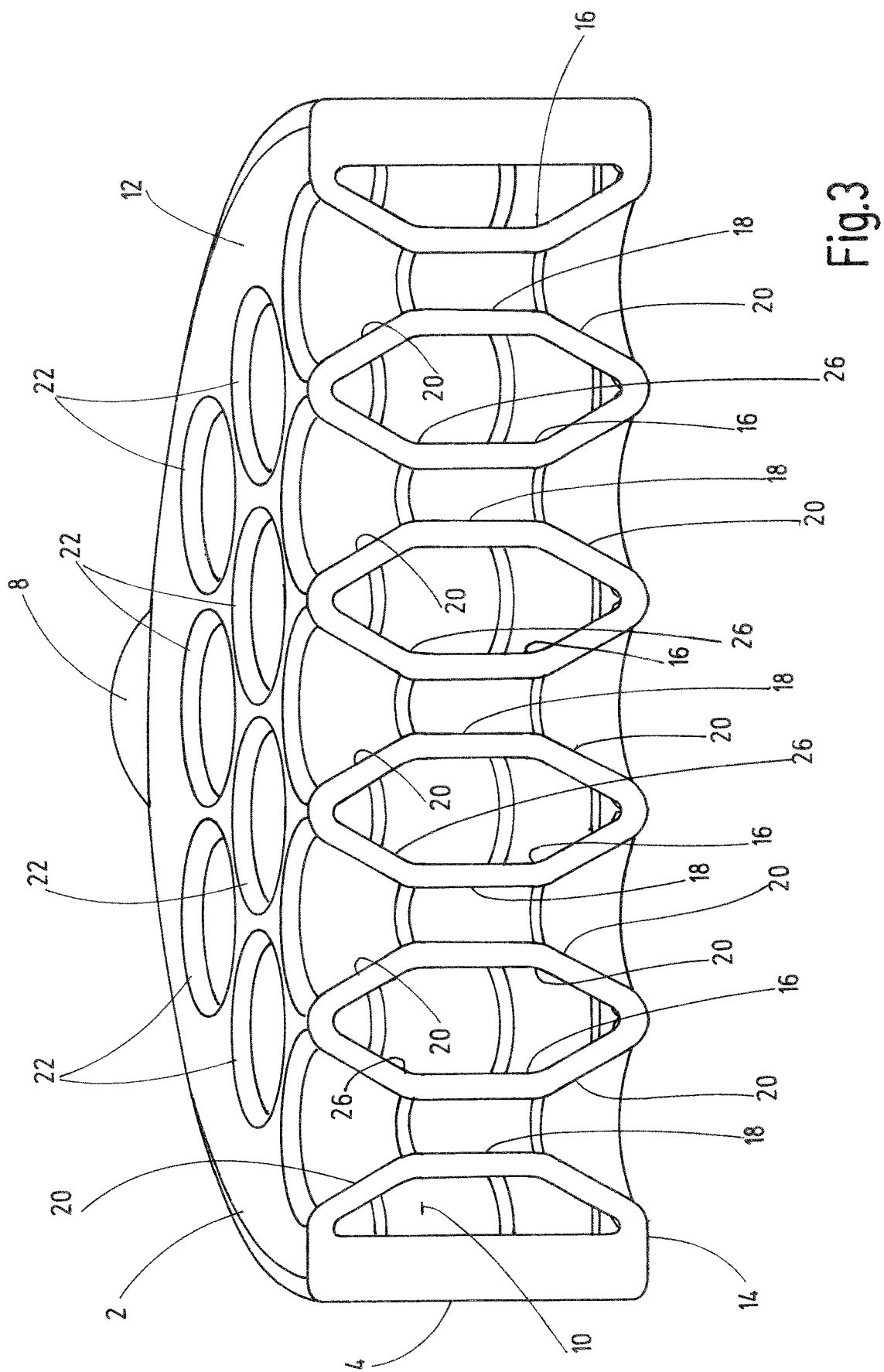
FIG. 3 is a perspective view of a central cross-section through the damping housing of FIG. 2.

In the example shown, the guide elements 16 in the rows 28 are arranged in such a way that the guide elements 16 of one row 28 are each offset by one guide element 16 relative to the guide elements of the next row 28. Also, the guide elements 16 are arranged adjacent to one another in such a way that their ends 22 merge into the assigned end walls 12, 14 and are at a small distance from one another or, as shown in FIG. 1, are in contact with one another. In this arrangement, as shown in FIG. 2, in a longitudinal section through the damping housing 2 extending centrally from the fluid inlet 6 to the fluid outlet 8, octagonal cavities 24 are formed between adjacent guide elements 16. In a cross-section having a sectional plane extending centrally through the damping housing 2 and perpendicular to the connecting line between the fluid inlet 6 and the fluid outlet 8, the guide elements 16 delimit hexagonal cavities 26 between them, through each of which the fluid flow passes in the main flow direction.

The plurality of guide bodies 16, provided in the invention, in the form of hollow bodies, which are integral with the front walls 12 and 14, provides the option of forming the damping housing 2, despite its lightweight construction, as a pressure vessel suitable for a high pressure level. The influence of the flow through the guide elements ensures efficient damping. Advantageously, the one-piece damper housing 2 can be realized by a 3D printing process.

While one embodiment has been chosen to illustrate the invention, it will be understood by those skilled in the art that various changes and modifications can be made therein without departing from the scope of the invention as defined in the claims.

The invention claimed is:

1. A damping device for damping or preventing pressure surges in hydraulic supply circuits, comprising:
a damping housing encompassing a damping chamber and having first and second opposing end walls, a fluid inlet and a fluid outlet, the damping chamber extending between the fluid inlet and the fluid outlet the damping housing configured such that a fluid flow in a flow direction coming from the fluid inlet passes through the damping chamber towards the fluid outlet, both the damping housing and the damping chamber being of a circular cylindrical or polygonal form; and
plural identical hollow guide elements extending between the first and second opposing end walls of the damping housing in the damping chamber in a direction of extension transverse to the flow direction of the fluid flow against which the fluid can flow and which alter the flow velocity in certain areas, the guide elements being integral with the first and second opposing end walls, having interior cavities being open at opposite ends thereof through the first and second opposing end walls and having conical axial end portions adjacent to one another and the first and second opposing end walls.

2. The damping device according to claim 1 wherein the guide elements are arranged in rows with at least some of the guide elements in each of the rows being laterally offset relative to the guide elements of an adjacent row forming an at least partially meandering fluid flow path between the guide elements.

3. The damping device according to claim 2 wherein a number of the guide elements in a respective one of the rows transverse to the direction of flow and in a first direction from the fluid inlet toward a greatest transverse extension of the damping chamber increases by one of the guide elements in each of the rows in the first direction and decreases by one of the guide elements in each of the rows in a second direction from one of the rows having a greatest number of the guide elements toward the fluid outlet until the number of guide elements in each of the rows closest to the fluid inlet and fluid outlet is identical.

4. A damping device according to claim 1 wherein the conical axial end portions of the guide elements merge into the first and second opposing end walls of the damping housing.

5. A damping device according to claim 1 wherein the guide elements are continuous hollow bodies having a cylindrical central part connected to and between the conical axial end portions, the conical axial end portions widening in directions of the first and second opposing end walls of the damping housing.

6. A damping device according to claim 1 wherein in a central longitudinal section through the damping housing, octagonal cavities are formed adjacent the guide elements.

7. A damping device according to claim 1 wherein in a central cross-section through the damping housing transverse to the direction of flow, the guide elements delimit hexagonal cavities between the guide elements.

8. A damping device according to claim 1 wherein the conical axial end portions of the guide elements merge into the first and second opposing end walls of the damping housing at locations where the conical axial end portions of adjacent ones of the guide elements are adjacent and spaced from each other or are in contact with each other.

9. A damping device according to claim 1 wherein the damping housing is formed integrally with the guide elements by a 3D printing process.

10. A damping device for damping or preventing pressure surges in hydraulic supply circuits, comprising:
a damping housing encompassing a damping chamber and having first and second opposing end walls, a fluid inlet and a fluid outlet, the damping chamber extending between the fluid inlet and the fluid outlet the damping housing being configured such that a fluid flow in a flow direction coming from the fluid inlet passes through the damping chamber towards the fluid outlet; and
plural hollow guide elements extending between the first and second opposing end walls of the damping housing in the damping chamber in a direction of extension transverse to the flow direction of the fluid flow against which the fluid can flow and which alter the flow velocity in certain areas, the guide elements being integral with the first and second opposing end walls and being continuous hollow bodies each having a cylindrical central part with conical axial end portions on opposite ends of the cylindrical central part, the conical axial end portions widening in directions of the first and second opposing end walls of the damping housing.

11. The damping device according to claim 10 wherein the guide elements are arranged in rows with at least some of the guide elements in each of the rows being laterally offset relative to the guide elements of an adjacent row forming an at least partially meandering fluid flow path between the guide elements.

12. The damping device according to claim 11 wherein a number of the guide elements in a respective one of the rows transverse to the direction of flow and in a first direction from the fluid inlet toward a greatest transverse extension of the damping chamber increases by one of the guide elements in each of the rows in the first direction and decreases by one of the guide elements in each of the rows in a second direction from one of the rows having a greatest number of the guide elements toward the fluid outlet until the number of guide elements in each of the rows closest to the fluid inlet and fluid outlet is identical.

13. A damping device according to claim 10 wherein the conical axial end portions of the guide elements merge into the first and second opposing end walls of the damping housing.

14. A damping device according to claim 10 wherein in a central longitudinal section through the damping housing, octagonal cavities are formed adjacent the guide elements.

15. A damping device according to claim 10 wherein in a central cross-section through the damping housing transverse to the direction of flow, the guide elements delimit hexagonal cavities between the guide elements.

16. A damping device according to claim 10 wherein the conical axial end portions of the guide elements merge into the first and second opposing end walls of the damping housing at locations where the conical axial end portions of adjacent ones of the guide elements are adjacent and spaced from each other or are in contact with each other.

17. A damping device according to claim 10 wherein the damping housing is formed integrally with the guide elements by a 3D printing process.

* * * * *